United States Patent [19]

Yamamoto et al.

[11] Patent Number: 5,373,575
[45] Date of Patent: Dec. 13, 1994

[54] FREQUENCY DOUBLER AND SHORT WAVE LASER SOURCE USING THE SAME AND OPTICAL DATA PROCESSING APPARATUS USING THE SHORT WAVE LASER SOURCE

[75] Inventors: Kazuhisa Yamamoto, Settsu; Kiminori Mizuuchi, Neyagawa, both of Japan

[73] Assignee: Matsushita Electric Industrial Co., Ltd., Osaka, Japan

[21] Appl. No.: 7,859

[22] Filed: Jan. 22, 1993

[30] Foreign Application Priority Data

Jan. 27, 1992 [JP] Japan .................................. 4-011645
Jan. 27, 1992 [JP] Japan .................................. 4-011651

[51] Int. Cl.$^5$ ............................................. G02F 1/37
[52] U.S. Cl. ................................. 385/122; 359/328; 359/332; 385/130
[58] Field of Search ............................ 359/326–332; 385/27, 28, 122, 123, 129, 130

[56] References Cited

U.S. PATENT DOCUMENTS

| | | | |
|---|---|---|---|
| 4,923,277 | 5/1990 | Okazaki et al. | 385/123 |
| 4,971,416 | 11/1990 | Khanarian et al. | 359/328 |
| 5,082,349 | 1/1992 | Cordova-Plaza et al. | 385/28 X |
| 5,113,469 | 5/1992 | Hatakoshi et al. | 385/122 |
| 5,205,904 | 4/1993 | Yamamoto et al. | 156/664 |
| 5,218,661 | 6/1993 | Droste et al. | 385/122 |
| 5,249,191 | 9/1993 | Sawaki et al. | 385/122 X |
| 5,253,259 | 10/1993 | Yamamoto et al. | 385/130 X |

FOREIGN PATENT DOCUMENTS

0382462A3 8/1990 European Pat. Off. .

OTHER PUBLICATIONS

Kazuhisa Yamamoto, et al, "Milliwatt–order blue–light generation in a periodically domaininverted LiTaO$_3$ waveguide", Optics Letters, vol. 16, No. 15, Aug. 1, 1991, pp. 1156–1158.

Kiminori Mizuuchi, et al, "Fabrication of first–order periodically domain–inverted structure in LiTaO$_3$", Applied Physics Letters, vol. 59, No. 13, Sep. 23, 1991, pp. 1538–1540.

T. Fujiwara, "A study on dielectric nonlinear optical waveguide", INSPEC, Institution of Electrical Engineers, Hitchin, GB, abstract No. 3786165 & Record of Electrical and Communication Engineering Conversazione Tohoku University, May 1990, pp. 177–178.

J. Khurgin, "Improvement of frequency–conversion efficiency in waveguides with rotationally twinned layers", Optics Letters, vol. 13, No. 7, Jul. 1988, pp. 603–605.

Primary Examiner—John D. Lee
Attorney, Agent, or Firm—Stevens, Davis, Miller & Mosher

[57] ABSTRACT

A frequency doubler comprising periodic domain-inverted regions, in which a nonlinear degradation layer is formed on the surface of a waveguide, whereby the $TM_{00}$ mode of the fundamental wave is converted into the $TM_{10}$ mode of the high harmonic wave so as to reduce the effects of optical damage in order to stably output the $TM_{10}$ mode of the high harmonic wave.

9 Claims, 13 Drawing Sheets

BEAM INTENSITY

FREQUENCY DOUBLER AND SHORT WAVE LASER SOURCE USING THE SAME AND OPTICAL DATA PROCESSING APPARATUS USING THE SHORT WAVE LASER SOURCE

BACKGROUND OF THE INVENTION

Field of the Invention

The present invention relates to a frequency doubler which makes use of coherent light, for use in the field of optical data processing, or in the field of applied optic measurement control, and also relates to a short wave laser source and an optical data processing apparatus, and also relates to a method of manufacturing a frequency doubler.

FIG. 16 is a structure of a conventional short wave laser source which is composed of a semiconductor laser 21 and a frequency doubler 22, in which a fundamental wave P1 emitted from the semiconductor laser 21 passes through lenses 24, 25 and a half-wave plate 26 and then enters into a waveguide 2 formed in the frequency doubler 22. The fundamental wave P1 thus having entered is transmitted through the wave guide in a $TM_{00}$ mode which is a lowest order mode, and is converted into the $TM_{00}$ mode which is a lowest order mode of high harmonic waves which are used for a short wave laser beam radiated from the frequency doubler.

Referring FIG. 17, which is a schematic view illustrating a conventional frequency doubler basically using an waveguide, detailed explanation will be made hereinbelow of the generation of a high harmonic wave (wavelength of 0.42 $\mu$m) with respect to a fundamental wave having a wavelength of 0.84 $\mu$m (refer to "Optics Letters" by K. Yamamoto, K. Mizuuchi, and T. Taniuchi, Vol. 16, No. 15, August 1991, Page 1,156).

As shown in FIG. 17, a waveguide 2 is formed on a $LiTaO_3$ substrate 1, and a layer 3 whose domain is periodically inverted (domain-inverted structure) is formed in the waveguide 2. The high harmonic wave P2 can be produced with a high degree of efficiency by compensating inconsistency in a propagation coefficient between the fundamental wave P1 and the high harmonic wave P2 to be generated, through the periodical structure of the domain-inverted layer 3 and a domain-non-inverted layer 4. When the fundamental wave P1 is incident upon the entrance surface 10 of the waveguide 2, the high harmonic wave P2 is efficiently produced from the waveguide 2; that is, the substrate 1 having the above-mentioned structure serves as a frequency doubler.

Detailed explanation will be made of a method of manufacturing this conventional frequency doubler with reference to FIGS. 18a to 18d.

Referring at first to FIG. 18a, Ta 6 is periodically patterned on the $LiTaO_3$ substrate 1 with the use of usual photo-processing and dry-etching. Thereafter, the $LiTaO_3$ substrate formed thereon with a pattern of Ta 6 is subjected to proton-exchange at a temperature 260 deg. C. for 50 minutes so as to form proton-exchange regions 7 having a thickness of 0.8 $\mu$m directly below slits which are not covered with the Ta 6. Next, referring to Fig. 18b, it is heat-treated at 600 deg. C. for 10 minutes. The temperature rising rate for the heat-treatment is set to 50 deg. C./min. Accordingly, domain-inverted regions 3 are periodically formed since the proton exchange regions 7 have reduced Li so that the Curie temperature is low in comparison with the Li-$TaO_3$ substrate 1; thereby the domain can be partly inverted. Then, etching is made with the use of a mixed solution of HF and $HNF_3$ the ratio of which is 1:1, for two minutes, so as to remove the Ta 6. Further, a waveguide is formed in the above-mentioned domain-inverted regions with the use of proton-exchange, and thereafter, as shown in FIG. 18c, Ta as a mask for the waveguide is patterned in a stripe-like manner so that a slit having a width of 4 $\mu$m and a length of 12 mm is formed in the Ta mask. The substrate covered with the Ta mask is subjected to proton-exchange at a temperature of 260 deg. C. for 16 minutes so as to form a proton-exchange layer 5 having a thickness of 0.5 $\mu$m. Next, referring to Fig. 18d, the substrate is subjected to heat-treatment at a temperature of 380 deg. C. for 10 minutes after the Ta mask is removed. An area directly below the slit in the protective layer having been subjected to the proton-exchange is turned into the waveguide 2 having a refraction index increased by about 0.03. In this case, the crystallizability of $LiTaO_3$ is deteriorated so as to loose a non-linear optical effect during the proton-exchange for forming the waveguide. That is, the high refractive index layer 5 which has been at first subjected to the proton-exchange has lost its non-linear optical effect. However, the proton exchange layer 5 is enlarged by the heat-treatment so as to be turned into the waveguide 2, and in this condition the non-linearity is substantially recovered.

With the frequency doubler manufactured by this conventional method, a $TM_{00}$ mode which is the lowest order mode of the high harmonic wave P2 can be obtained, having an output power of 2.4 mW and a conversion efficiency of 2.4%, with respect to the $TM_{00}$ mode which is the lowest order mode of the fundamental wave P1 having a wavelength of 0.84 $\mu$m and propagating through the waveguide 2 if the length of the waveguide 2 is set to 9 mm, and the power of the fundamental wave P1 is set to 99 mW. In this case, the reduced conversion efficiency is 24%/W.

With the use of a 10 mW semiconductor laser as a short wave laser source constituted by the above-mentioned frequency doubler as shown in the figures, 70 mW of the laser beam enters the frequency doubler from which 1.2 mW of blue laser light is then obtained as a short wave laser beam.

Next, explanation will be made of another conventional example with reference to the drawings. In this example, the $TM_{00}$ mode of the fundamental wave and the $TM_{10}$ mode of the high harmonic wave are coupled together in the waveguide (Refer to "Light Wave Guide Electronics", the Japan Society for the Promotion of Science, Page 88).

FIGS. 19a shows an enlarged section of the waveguide and an electric field strength distribution of the fundamental wave and the high harmonic wave. Further, FIG. 19b is a sectional view illustrating the waveguide in the frequency doubler.

As shown in FIG. 19a, the $TM_{00}$ mode has one peak of electric field. Meanwhile, the $TM_{01}$ mode has two electric field peaks in the thicknesswise direction, and the phases of these peaks are inverted with respect to each other. ZnS 2a, which is a nonlinear optical crystal, is formed on a glass substrate 1b, and thereafter, a linear layer 9 made of $TiO_2$ having nonlinear optical effect is applied thereto by vapor deposition by sputtering. Accordingly, the conversion between the $TM_{00}$ mode of the functional wave and the $TM_{10}$ mode of the high harmonic wave can be made with a high degree of efficiency. That is, in the case of conversion between the $TM_{00}$ mode of the fundamental wave and the $TM_{01}$ mode of the high harmonic wave within a nonlinear optical crystal with no linear layer 9, high harmonic wave energies produced on the $+E$ side and $-E$ side of the electric field are canceled by each other, so that substantially no high harmonic wave can be obtained.

With the above-mentioned frequency doubler basically using a waveguide formed in nonlinear optical crystal as mentioned above; in the case of the conversion between the lowest order modes of the fundamental wave and the high harmonic wave, that is, more specifically, in the case of conversion from the $TM_{00}$ mode of the fundamental wave into the $TM_{00}$ mode of the high harmonic wave, there has been found a problem in which a variation in output power of the high harmonic wave is induced by fluctuation in refractive index caused by optical damage. FIGS. 20a and 20b show the electric field strength distributions and the refractive index distributions of the $TM_{00}$ mode of the fundamental wave and the $TM_{00}$ mode of the high harmonic wave in the section of the waveguide. In a normal condition in which no optical damage is present, the refractive index of the waveguide part is uniformly higher than that of the $LiTaO_3$ substrate as shown in FIG. 20a. Although the actual refractive index distribution is graded, a rectangular distribution is used in this explanation for the sake of brevity. The optical damage is likely to occur in a short wave range of, for example, 0.4 $\mu$m band; that is, the higher the light intensity, the greater the refractive index decrease. When the $TM_{00}$ mode of the high harmonic wave is produced, the refractive index decreases around a peak in the electric field of the $TM_{00}$ mode. On the contrary, the refractive index around the $TM_{00}$ mode of the high harmonic wave increases. Accordingly, the $TM_{00}$ mode of the fundamental wave is shifted toward the substrate, so that the superposition between the modes of the fundamental wave and the high harmonic wave are lowered, resulting in lowering of the output power of the high harmonic wave. If the output power of the high harmonic wave is lowered, the optical damage is remedied, so that the original condition is recovered. Thereafter, the above-mentioned relationship is repeated, and accordingly, it is considered that the output power of the high harmonic wave becomes unstable. Specifically, 50% of variation in output power occurs when 3.5 mW of the high harmonic wave is produced.

Further, in the case of the conventional method in which a linear layer is applied onto nonlinear optical crystal by sputtering, when the conversion from the $TM_{00}$ mode into the $TM_{01}$ mode of the high harmonic wave is carried out, the film thickness of the layer formed by the sputtering varies by about 100 nm, which greatly exceeds a tolerance of 10 to 20 nm for the film thickness of the device. Thus, a high degree of efficiency cannot be obtained. As in this example, a linear layer built up by vapor deposition or epitaxial growth is, in general, not uniform, and accordingly, similar results are obtained.

SUMMARY OF THE INVENTION

The present invention is devised in order to eliminate disadvantages as mentioned above, and accordingly, one object of the present invention is to provide a frequency doubler which can stably produce a high harmonic wave having a high power and to provide a method of manufacturing thereof.

Further, another object of the present invention is to provide a short wave laser source which can stably produce a short wave laser beam having a high output power with no variation in output power, and a high performance optical data processing apparatus using the same.

Thus, according to the present invention, new resources are added to the structure of a conventional frequency doubler in order to solve the above-mentioned problems so as to provide a frequency doubler which can highly efficiently and stably emit a high harmonic wave. That is, a frequency doubler according to the present invention comprises domain-inverted regions which are periodically formed, a non-linear degradation layer or a reinverted layer and a waveguide, and further comprises a means for converting a lowest order mode of a fundamental wave which is excited in the waveguide into a high order mode of a high harmonic wave.

Further, according to the present invention there is provided a method of manufacturing a frequency doubler, comprising the steps of forming periodic domain-inverted regions in nonlinear optical crystal, forming a nonlinear degradation layer with the use of a proton-exchange process or an ion implantation process, and forming a waveguide.

Further, according to the present invention, new resources are added to the arrangement of a conventional short wave laser source so as to provide a short wave laser source which can highly efficiently and stably emit a high harmonic wave. That is, according to the present invention, there is provided a short wave laser source comprising a semiconductor laser, a frequency doubler, and means for converting the lowest order mode of a fundamental wave emitted from the semiconductor laser and introduced into and guided in a waveguide formed in the frequency doubler, into the high order mode of a high harmonic wave within the light guide wave, and for emitting the thus obtained high harmonic wave from the exit end surface of the waveguide.

Further, according to the present invention, there is provided an optical data processing apparatus comprising a short wave laser source including a semi-conductor laser and a frequency doubler, and a data recording and reproducing medium, and a means for introducing a fundamental wave from the semiconductor laser into a waveguide formed in the frequency doubler, and for emitting a high order mode of a high harmonic wave produced in the waveguide, from an exit end surface of the waveguide into a space from which the harmonic wave is introduced into the recording and reproducing medium.

With the frequency doubler according to the present invention in which the nonlinear degradation layer or the domain-reinverted layer is formed on the surface of the nonlinear optical crystal, the cancel-out between the $+E$ side and $-E$ side electric fields of the $TM_{10}$ mode of the high harmonic wave can be prevented, and accordingly, the $TM_{10}$ mode can be produced highly efficiently and simply. A variation in refractive index caused by the $TM_{10}$ mode of the high harmonic wave is relatively smaller than that caused by the $TM_{00}$, since the peak of the electric field of the $TM_{10}$ mode is dispersed into two parts, and an effect upon the fundamental wave is extremely small, since the variation in refractive index is uniformly distributed with respect to the $TM_{00}$ mode of the fundamental wave. Accordingly, the frequency doubler having the above-mentioned structure can greatly reduce the variation caused by optical damage while the high power of the high harmonic wave is maintained, and accordingly, a stable output power of the high harmonic wave can be obtained.

Further, with the short wave laser source according to the present invention in which the fundamental wave from the semiconductor laser is converted into the high order mode of the high harmonic wave from the lower order mode of the fundamental wave within the frequency doubler, a variation in refractive index caused by the $TM_{10}$ mode of the high harmonic wave is relatively smaller than that caused by the $TM_{00}$ mode, since the electric field peak of the $TM_{10}$ mode is dispersed into two parts, and an effect upon the fundamental wave is extremely small, since the variation in refractive index is uniformly distributed with respect to the $TM_{00}$ mode. Accordingly, the short wave laser source having the above-mentioned arrangement can greatly reduce the variation caused by optical damage while the output power of the high harmonic wave is maintained; thereby it is possible to obtain a stable short wave laser beam.

Other and further objects, features and advantages of the invention will be appear more fully and clearly from the from the following description.

BRIEF DESCRIPTION OF THE DRAWINGS

FIG. 3b is a schematic sectional view illustrating the frequency doubler shown in FIG. 3a;

DESCRIPTION OF THE PREFERRED EMBODIMENTS

Figure 1:
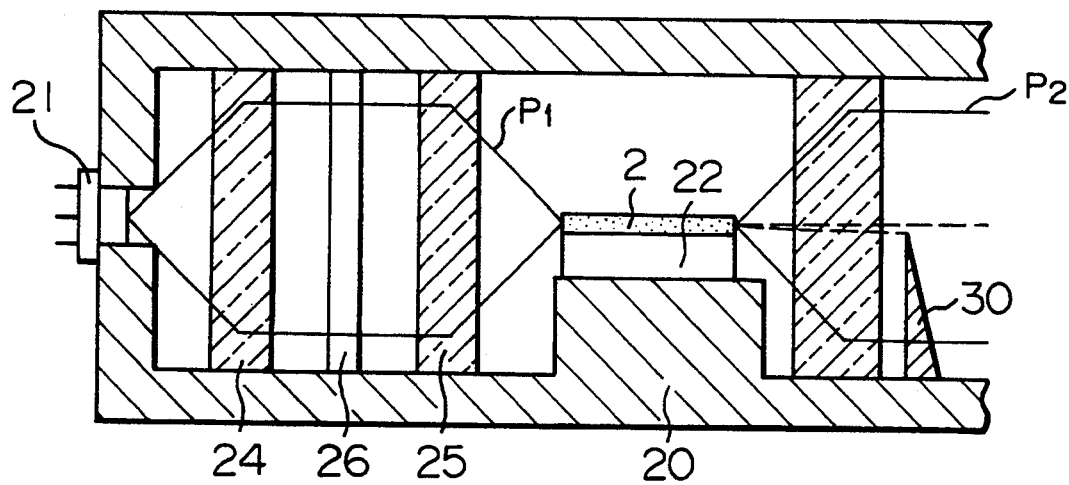
FIG. 1 is a schematic view illustrating a short wave laser source in one embodiment form of the present invention.
Figure 2A:
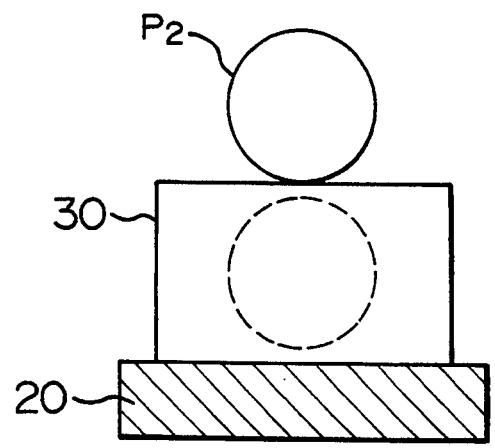
FIG. 2a is a front view illustrating the short wave laser source as shown in FIG. 1.
Figure 2B:
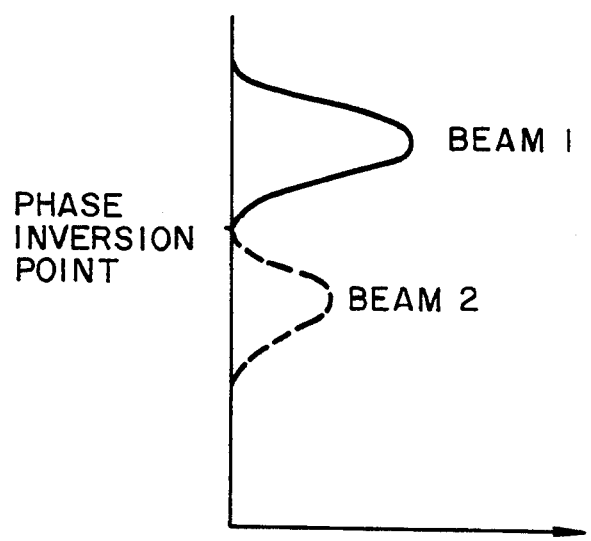
FIG. 2b is a graph showing a beam intensity distribution.

FIG. 1 shows a short wave laser source in one embodiment of the present invention, which is composed of a semiconductor laser 21 and a frequency doubler 22. A fundamental wave P1 emitted from the semiconductor laser 21 is incident upon a waveguide 2 formed in the frequency doubler 22 by way of lenses 24, 25 and a half-wave plate 26. Further, these components are all fixed to a mount 20. The fundamental wave P1 propagates in a $TM_{00}$ mode which is a lowest order mode through the waveguide 2 and is then converted into a $TM_{10}$ mode which is a high order mode of a high harmonic wave. This high harmonic wave is used as a short wave laser beam emitted from the frequency doubler 22. A part of this beam is cut by use of a beam cut plate 30. FIG. 2a is a front view showing the short wave laser source, and FIG. 2b shows a beam intensity distribution in order to explain the role of the beam cut plate 30. The beam of the high harmonic wave P2 has two intensity peaks in the waveguide, and also has two peaks on the beam 1 side and the beam 2 side where the phase is inverted, respectively, even after it is emitted into a space, as shown in FIG. 2b. In order to obtain a normal single beam, the beam 2 having a small power is introduced through the beam cut plate fixed to the mount 20 so as to be cut by the phase inverting part thereof. As is in this embodiment, with this simple arrangement in which an optical system for cutting a beam is used, a single beam can be obtained. Further, instead of the beam cut plate, a pin hole can be used satisfactorily.

Figure 3A:
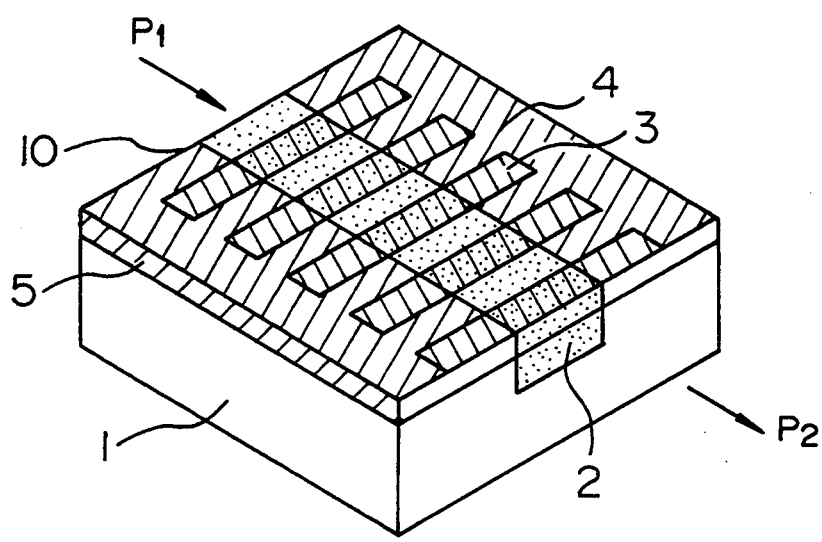
FIG. 3a is a schematic perspective view illustrating a frequency doubler used in the short wave laser source shown in FIG. 1.
Figure 3B:
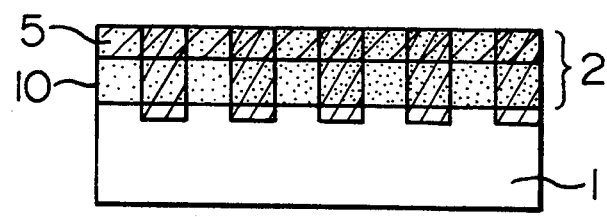

Explanation will be made of the structure of the frequency doubler which is a basic component of the short wave laser source with reference to the drawings. FIGS. 3a and 3b show the structure of the frequency doubler according to the present invention. The light wave guide 2 and domain-inverted regions 3 are formed on a $LiTaO_3$ substrate which is a nonlinear optical crystal. Incidentally, FIG. 3a is a perspective view, and FIG. 3b is a sectional view along the center line of the waveguide 2. A degradation layer 5 having a nonlinearity lower than that of $LiTaO_3$ is formed by proton-exchange on the $LiTaO_3$ substrate 1. Since H in acid is substituted with Li in the substrate so as to form the nonlinear degradation layer 5 which is a proton-exchange layer, a substantial part of the proton-exchange layer is changed from $LiTaO_3$ having a nonlinear optical effect into $HTaO_3$ having no nonlinear optical effect, and accordingly, the nonlinearity thereof is degraded. The fundamental wave P1 having been incident upon the waveguide 2 is converted into the high harmonic wave P2 within the waveguide 2. The high harmonic wave P2 is increased by the domain-inverted regions 3b which are periodically formed and a domain-noninverted layer 4, and is then emitted from the $LiTaO_3$ substrate 1. FIG. 3 is an enlarged section view illustrating the waveguide 2. The fundamental wave P1 propagates through the waveguide 2 in the $TM_{00}$ mode which is the lowest order mode. When the fundamental wave has a wavelength $\lambda 1$, the $TM_{00}$ mode of the fundamental wave is susceptibly phase-matched with the $TM_{00}$ mode of the high harmonic wave. Further, as shown in the figure, when it has a wave length $\lambda 2$, the fundamental wave P1 is converted into the $TM_{10}$ mode of the high harmonic wave. This is because the wavelength which can phase-match is determined by an effective refractive index, and further, the effective refractive index for the high harmonic wave differs in dependence upon a mode.

Figure 4:
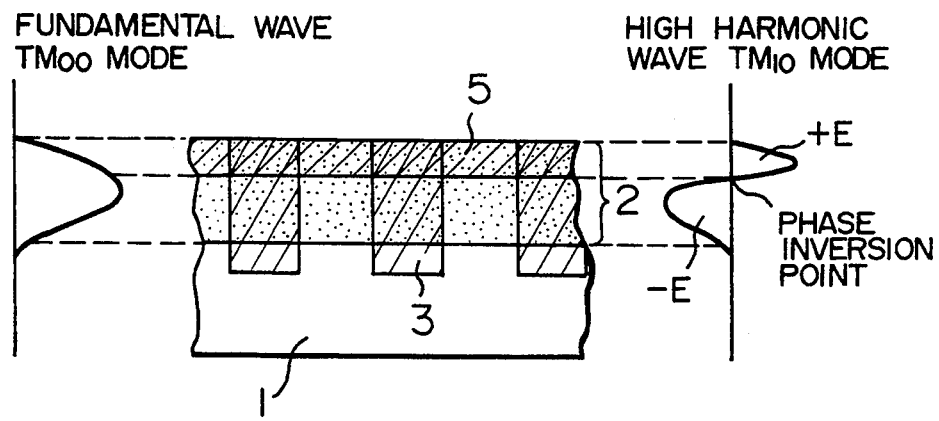
FIG. 4 is an enlarged sectional view illustrating a waveguide used in the first embodiment.

The reason why this frequency doubler delivers the $TM_{00}$ mode and the $TM_{10}$ mode of the high harmonic wave will be explained. When the false phase matching is established, the output power of the high harmonic wave can be obtained from the fundamental wave P1 through the domain-inversion. The false phase-matching can be established only when the period $\Lambda$ of the domain-inverted regions is coincident with $\lambda/(2(N2\omega-N\omega))$, that is, only when:

$$\Lambda = \lambda/(2(N2\omega - N\omega)) \quad \text{EQ1}$$

is established. Here, $N\omega$ is the effective refractive index for the fundamental wave (wavelength $\lambda$), and $N2\omega$ is an effective refractive index for the high harmonic wave (wavelength $\lambda/2$). In the equation EQ1, since the effective refractive indices ($N\omega$, $N2\omega$, $N'\omega$, $N'\omega$) of the $TM_{00}$ mode and the $TM_{10}$ mode are different from each other as shown in FIG. 4, if the period $\Lambda$ of the domain-inverted regions in the frequency doubler is constant, the wavelength satisfying the equation EQ 1 differs between the $TM_{00}$ mode and $TM_{10}$ mode of the high harmonic wave. Accordingly, the wavelength $\lambda 1$ of the fundamental wave which produces the high harmonic wave of the $TM_{00}$ mode and the wavelength $\lambda 2$ of the fundamental wave which produces the high harmonic wave of the $TM_{10}$ mode are directly determined respectively. Accordingly, in order to produce the high harmonic wave of the $TM_{10}$ mode, the fundamental wave (wavelength $\lambda 2$) which satisfies the equation EQ1 is introduced. Thus, the high harmonic wave of the $TM_{00}$ mode and also the high harmonic wave of the $TM_{10}$ mode can be produced by changing the wavelength of the fundamental wave to be introduced. The above-mentioned relationship is summarized in Table 1.

FIG. 4 shows the profiles of electric fields of the fundamental wave of the $TM_{00}$ mode and the high harmonic wave of the $TM_{10}$ mode. In the $TM_{10}$ mode of the high harmonic wave, the phases of the + side electric field (+E) and the − side electric field (−E) are opposed to each other across the phase inversion point as a boundary. This phase inversion point is substantially coincident with the boundary between the nonlinear degradation layer 5 and the nonlinear optical crystal. Since the nonlinearity is degraded on the +E side, the exchange of energy between the fundamental wave and the high harmonic wave does not occur substantially, so that substantially no high harmonic wave is produced on the +E side. Accordingly, the super-position of the fundamental wave and the high harmonic wave can be considered only on the −E side, and accordingly, it is possible to simply aim at enhancing the efficiency by optimization. If there is no degradation layer, the cancel-out between the energies of the high harmonic wave produced on the +E side and −E side occurs, and accordingly, the conversion into the high harmonic wave is not made substantially.

Figure 5A:
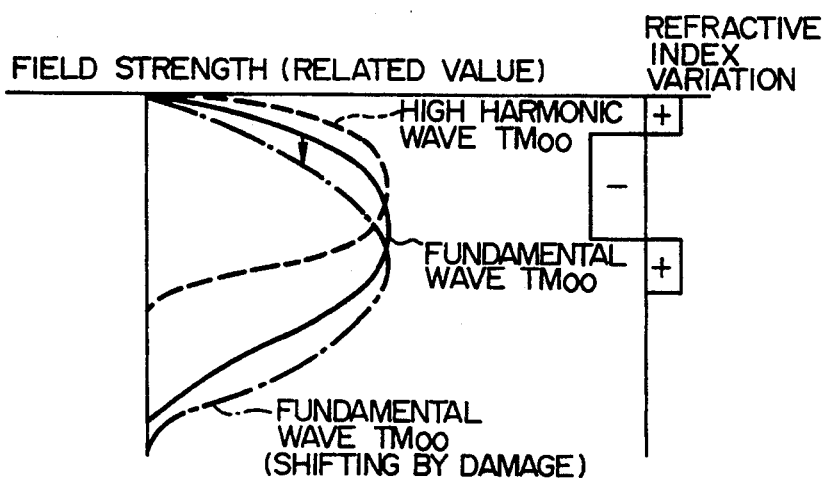
FIGS. 5a and 5b are graphs showing electric field distributions and refractive index distributions of the $TM_{00}$ mode of a fundamental wave and the $TM_{00}$ mode of a high harmonic wave.
Figure 5B:
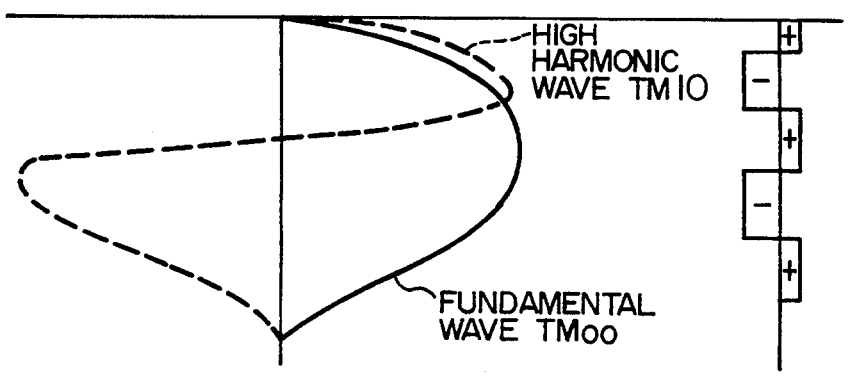

Then, explanation will be made of the effect caused by optical damage. FIGS. 5a and 5b show the electric field distributions of the $TM_{00}$ mode of the fundamental wave and the $TM_{00}$ mode and $TM_{10}$ mode of the high harmonic wave and variations in refractive index caused by optical damage. The optical damage tends to occur in a short wavelength range (for example, 0.4 $\mu$m band), and the higher the light intensity, the greater the lowering of the refractive index occurs. In the case of occurrence of the $TM_{00}$ mode of the high harmonic wave, the refractive index lowers about the peak of the electric field of the $TM_{00}$ mode of the high harmonic wave while the refractive index rises therearound due to the optical damage, and accordingly, the $TM_{00}$ mode of the fundamental wave is shifted inward. On the contrary, if the $TM_{10}$ mode occurs, parts in which the refractive index lowers and parts in which the refractive index rises are finely repeated, and accordingly, the fundamental wave exhibits an averaged refractive index as a whole so that variation in refractive index is less. Further, since such a fact that power is dispersed into two peaks causes variation in refractive index to be less, the fundamental wave is not shifted toward the substrate.

Figure 6A:
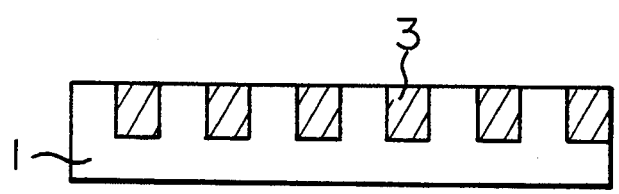
FIGS. 6a to 6c are sectional views for explaining a method of manufacturing a frequency doubler in the first embodiment form of the present invention.
Figure 6B:
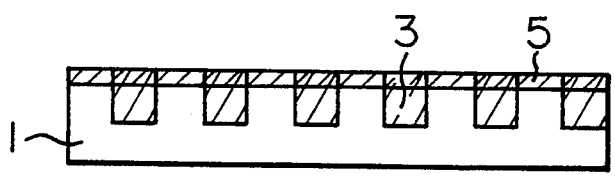
Figure 6C:
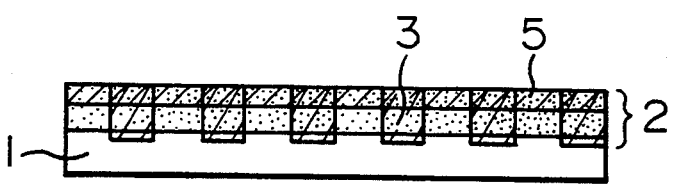

Next, a method of manufacturing the above-mentioned frequency doubler will be explained with reference to the drawings. FIGS. 6a to 6c show the manufacturing steps. Referring at first FIG. 6a, Ta is periodically patterned on the $LiTaO_3$ substrate 1 with the use of usual photo-processing and etching. The substrate on which the Ta has been patterned is subjected to proton-exchange in pyrophosphoric acid at a temperature of 260 deg. C. for 30 min so as to form a proton-exchange layer having a thickness of 0.65 $\mu$m directly below the slits, and thereafter, it is heat-treated at a temperature of 55 deg. C. for 1 min. The temperature rising rate for this heat-treatment is set to 50 deg. C./sec. Accordingly, the domain-inverted regions 3 are formed. Since nonuniform inversion occurs if the cooling rate is low, 30 deg. C./min is desirable therefor. Li in the proton-exchange layer decreases so that the Curie temperature lowers, and accordingly, domain-inversion can be partially made. Then, it is etched for two minutes in a mixed solution of HF and $HNF_3$ having a ratio of 1:1 so as to remove the Ta. Then referring to FIG. 6b, a nonlinear degradation layer 5 is formed on the domain-inverted regions 3 by proton-exchange. After Ta has been patterned to form a mask for proton-exchange, the substrate having a slit of 4 $\mu$m width and 12 mm long and formed in a Ta mask is subjected to proton-exchange in pyrophosphoric acid at a temperature of 260 deg. C. for 12 min. Thus, a nonlinear degradation layer 5 having a thickness of 0.45 $\mu$m is formed. The nonlinearity of this layer is degraded so that the nonlinear optical constant of $LiTaO_3$ is decreased to 1/5. Next, referring to FIG.

6c, after the Ta mask is removed, it is heat-treated with the use of an infrared heating device at a temperature of 40 deg. C. for 30 sec. With this heat-treatment, a part of the nonlinear degradation layer 5 becomes wider so as to form the waveguide 2 having a refractive index which is increased by about 0.03. In this condition, the nonlinear degradation layer still remains. Variations in the thickness of the waveguide 2 and the nonlinear degradation layer 5 are less; that is, less than 10 nm. This is because of using the phenomenon of diffusion. Finally, SiO$_3$ is added by vapor deposition so as to form a protecting film having a thickness of 0.3 $\mu$m. With the above-mentioned steps, the waveguide 2 is formed. The thickness (d) of the waveguide 2 is 1.8 $\mu$m which is less than the thickness 0.2 $\mu$m of the domain-inverted regions, and accordingly, the wavelength conversion is effective. The period of the domain-inverted regions is 3.8 $\mu$m which is effective with respect to a wavelength of 0.84 nm, and accordingly, the TM$_{10}$ mode of the high harmonic wave can be produced. It is noted that the TM$_{00}$ mode is produced at 0.81 $\mu$m with this period. The surfaces perpendicular to the waveguide 2 are optically polished so as to form a light entrance surface and a light exit surface. Thus, the manufacture of the light wave conversion device can be completed. Incidentally, the length of this device is 10 mm.

Figure 8:
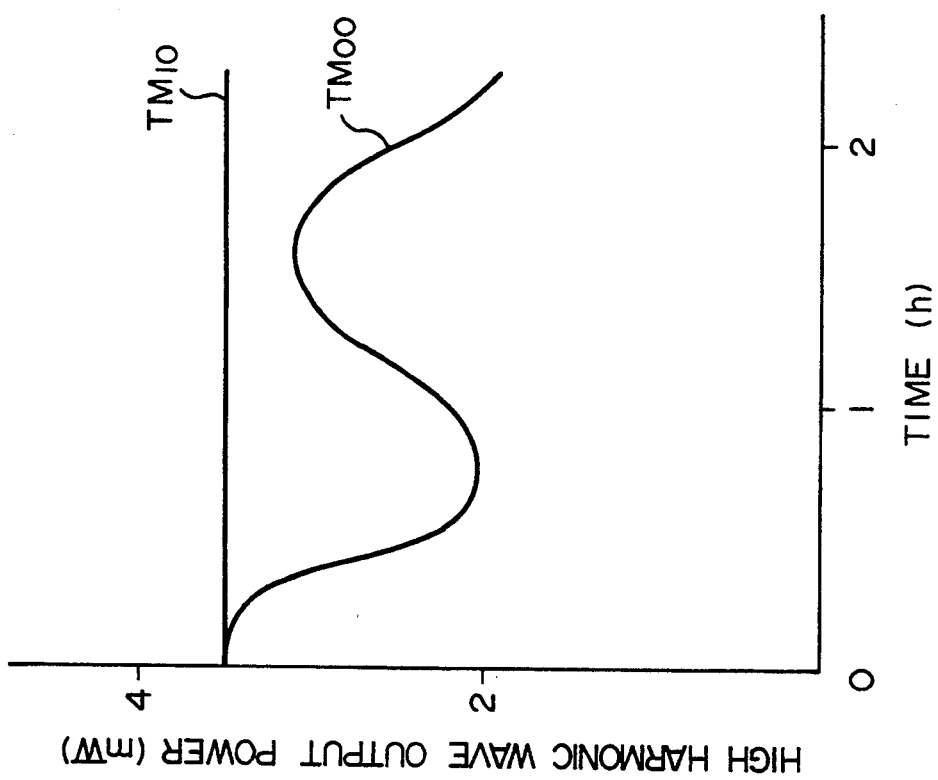
FIG. 8 is a characteristic view showing the time-dependency of the output power of the high harmonic wave emitted from the short wave laser beam.
Figure 7:
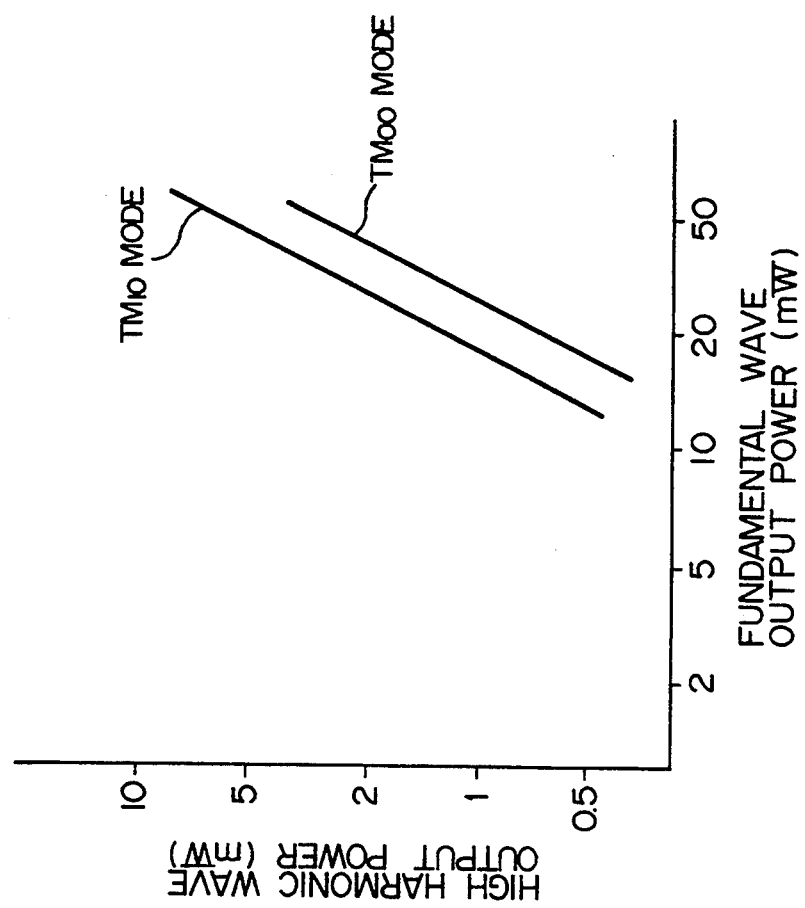
FIG. 7 is a characteristic view showing a relationship between the output powers of the fundamental wave and the high harmonic wave.

Explanation will be made of the characteristic of a short wave laser source using the above-mentioned frequency doubler as its basic component. 50% of the fundamental wave P1 emitted from a 80 mW semiconductor laser is introduced into the frequency doubler. The wavelength of the fundamental wave P1 is 0.84 $\mu$m. The fundamental wave is led from the entrance part and propagates in a single mode, and the high harmonic wave P2 having a wavelength of 0.42 $\mu$m is taken out from the exit part of the substrate. That is, the input of 40 mW of the fundamental wave can produce 4 mW of the high harmonic wave (wavelength 0.42 $\mu$m). In this case, the conversion efficiency is 10% which is twice as high as the conversion efficiency of the conventional TM$_{00}$ mode. FIG. 7 shows the relationship between the fundamental wave and the high harmonic wave. The output power of the TM$_{10}$ mode is twice as high as that of the TM$_{00}$ mode. In the case of complete superposition of the TM$_{00}$ mode of the fundamental wave and the TM$_{00}$ mode of the high harmonic wave, the conversion efficiency is high, but the superposition of the lowest order modes with each other is difficult, so that the efficiency is lowered. FIG. 8 shows the time-dependency of the output power of the high harmonic wave emitted from the short wave laser source. No substantial variation occurs in the TM$_{10}$ mode. This should be compared with the conventional short wave laser source for producing the TM$_{00}$ mode of the high harmonic wave, in which the variation amounts up to about 50%.

It is noted that the TM$_{00}$ mode and the TM$_{10}$ mode are used as the lowest order mode of the fundamental wave and the high order mode of the high harmonic wave, respectively, in this embodiment, since the superposition in this combination is largest, so that the conversion efficiency can be high and effective.

Figure 9:
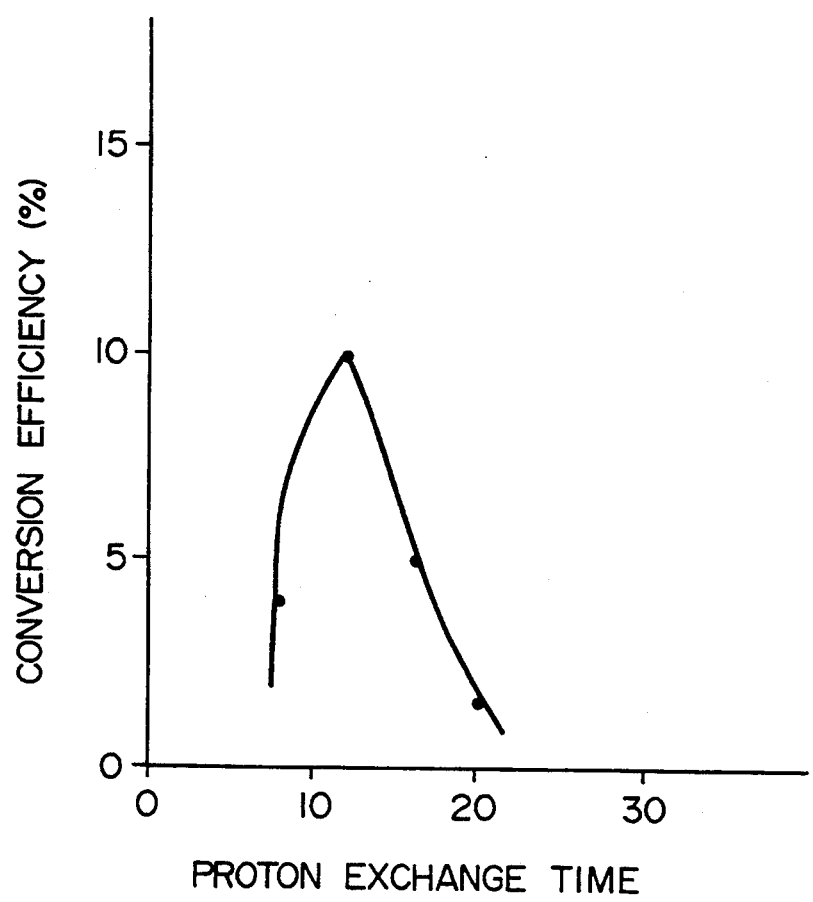
FIG. 9 is a characteristic view showing the time of proton-exchange and the efficiency of conversion into the output power of the high harmonic wave.

FIG. 9 shows the relationship between the time of proton-exchange and the conversion efficiency. It is most suitable that the proton-exchange temperature be 260 deg. C. and the proton-exchange time be 12 min. This is because the boundary between the nonlinear degradation layer and the substrate in which the nonlinearity is not degraded is coincident with the phase inversion point of the TM00 mode. It is noted that the TM00 mode and the TM10 mode are used as the lowest order mode of the fundamental wave and the highest order mode of the high harmonic wave, respectively, in this embodiment, since the superposition in this combination is large so that the conversion efficiency is high and effective.

Figure 10A:
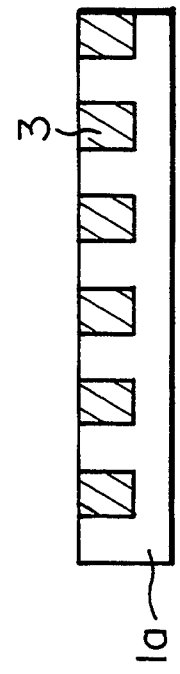
FIGS. 10a to 10c are sectional views for explaining a method of manufacturing a frequency doubler in a second embodiment form of the present invention.
Figure 10B:
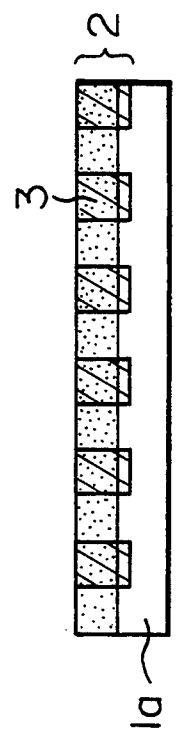
Figure 10C:
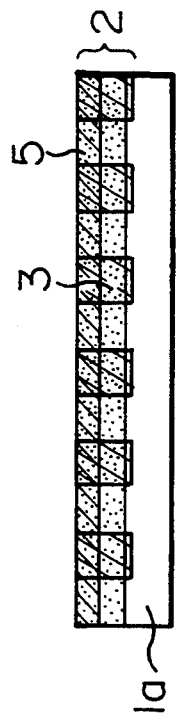

Explanation will be made of a method of manufacturing frequency doubler in a second embodiment of the present invention. The structure of the frequency doubler is similar to that of the first embodiment. In this embodiment, a reinverted layer is used instead of the nonlinear degraded layer. FIGS. 10a to 10c show the steps of manufacturing the frequency doubler in this embodiment. Referring to FIG. 10a, domain-inverted regions 3 are formed on a LiTaO$_3$ substrate 1 by proton-exchange and heat-treatment. Then, referring to FIG. 10b, a slab-like proton-exchange layer having a thickness of 0.1 $\mu$m is formed, and thereafter, it is heat-treated at a temperature of 540 deg. C. for 1 min so as to form a reinverted layer 5a having a thickness of 0.8 $\mu$m. The domain of this reinverted layer 5a is opposed to that of the domain-inverted regions 3; that is, it is coincident with the domain direction of the LiTaO$_3$ substrate 1. Next, referring to FIG. 10c, a waveguide 2 is formed by proton-exchange in phosphoric acid, and thereafter, it is heat-treated at a temperature of 400 deg. C. for 3 min with the use of an infrared heating device by which heating in a short time can be made in a satisfactory controllable condition. The thickness thereof is 1.9 $\mu$m, the width 4 $\mu$m, the thickness of the domain-inverted regions is 1.7 $\mu$m. The conversion efficiency of the embodiment with respect to a wavelength of 0.84 $\mu$m is high, since a first order domain inversion period is used; that is, 3 mW of the fundamental wave, so that the conversion efficiency is 7.5%. Variation caused by optical damage does not occur so that output power of the high harmonic wave is extremely stable.

Figure 11A:
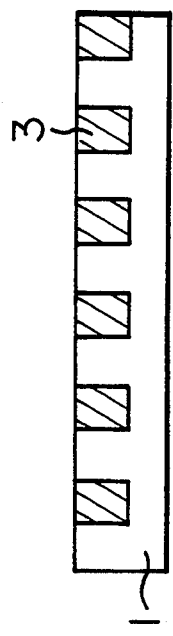
FIGS. 11a to 11c are sectional views for explaining a method of manufacturing a frequency doubler in a third embodiment form of the present invention.
Figure 11B:
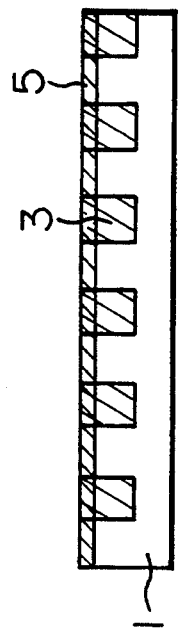
Figure 11C:
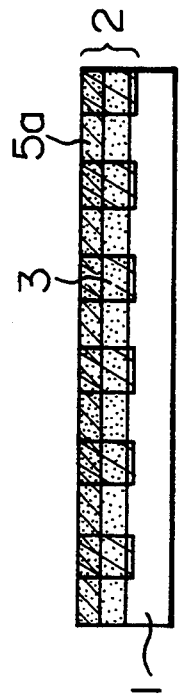

Next, explanation will be made of a method of manufacturing a frequency doubler in the third embodiment of the present invention. The structure of the frequency doubler is similar to that of the first embodiment. In this embodiment, a nonlinear degradation layer is used similar to the first embodiment. FIGS. 11a to 11c show the steps of manufacturing the frequency doubler in this embodiment. Referring to FIG. 11a, SiO$_2$ is formed on the LiNbO$_3$ substrate 1 which is then heat-treated at 1,080 deg. C. for 90 min so as to form domain-inverted regions, and then the SiO$_2$ is removed. Next, referring to FIG. 11b, a waveguide 2 is formed by proton-exchange in pyrophosphoric acid at a temperature of 230 deg. C. for 2 min, and thereafter, it is heat-treated at a temperature of 350 deg. C. for 60 min in the atmosphere of oxygen. The formed waveguide 2 has a thickness of 2 $\mu$m, the width of 4 $\mu$m and the length of 1 cm. Referring to FIG. 11c, a slab-like proton exchange layer is formed by heat-treatment in pyrophosphoric acid at a temperature of 230 deg. C. for 10 min. This proton exchange layer serves as a nonlinear degradation layer 5. This nonlinearity of the layer is lowered to 1/7 of the nonlinearity of the LiTaO$_3$ substrate. The period of the domain-inversion is 9 $\mu$m, and the thickness of the domain-inverted regions is 1.5 $\mu$m. The conversion efficiency of the embodiment with respect to a wavelength of 0.84 $\mu$m is high, since a third order domain inversion period is used, which is 1% with respect to the input of 40 mW of the fundamental wave. Optical damage does not occur, so that output power of the high harmonic wave is extremely stable. In this embodiment, if the nonlinear degradation layer is formed after formation of the waveguide, the nonlinear optical effect is further reduced, so that the efficiency becomes higher. Further, by using ion implantation so as to implant He, Ar or the like into the surface of nonlinear optical crystal, the nonlinear degradation layer can be formed similarly. Further, the $TE_{00}$ mode can be used as the lowest order mode of the fundamental wave, while the $TE_{10}$ mode or the like can be used as the high order mode of the high harmonic wave.

Figure 12:
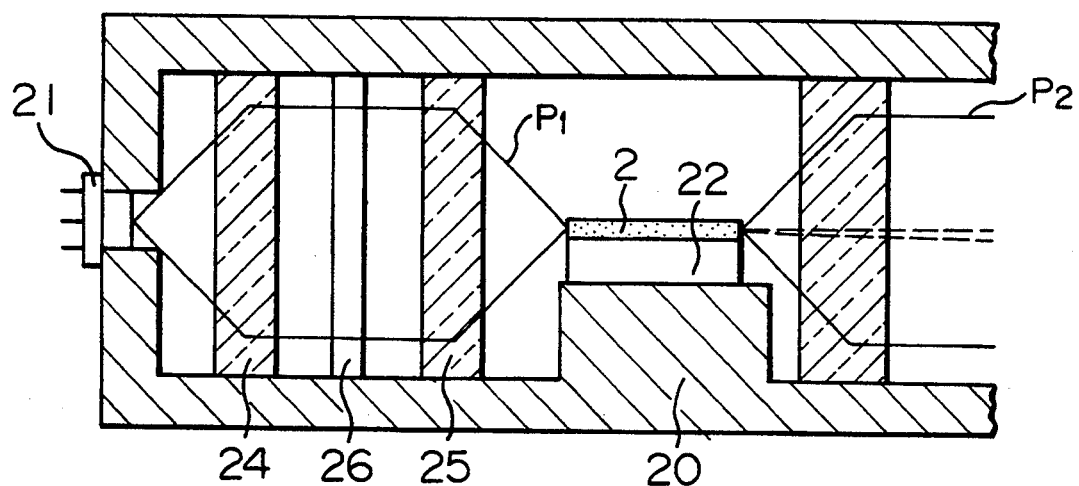
FIG. 12 is a schematic view illustrating a short wave laser source in a fourth embodiment form of the present invention.
Figure 13:
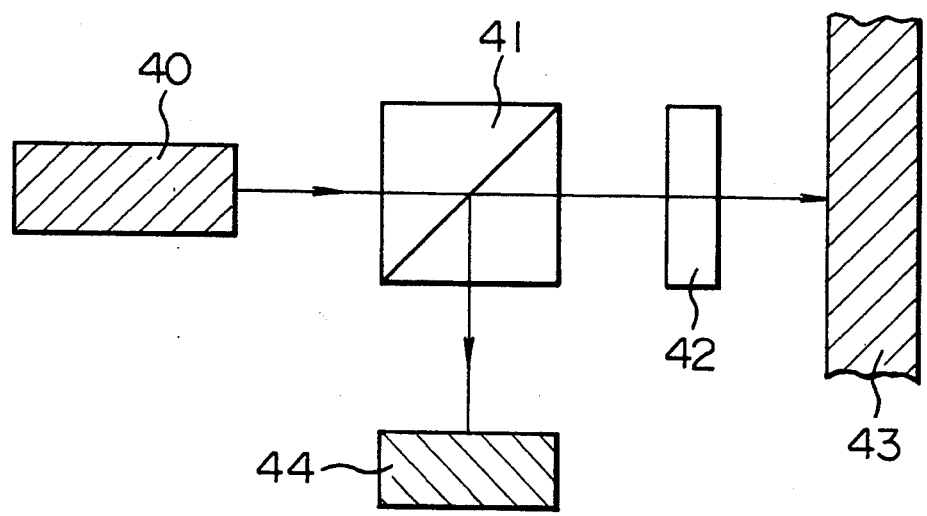
FIG. 13 is a schematic view illustrating an optical data processing apparatus in the fourth embodiment form of the present invention.
Figure 14A:
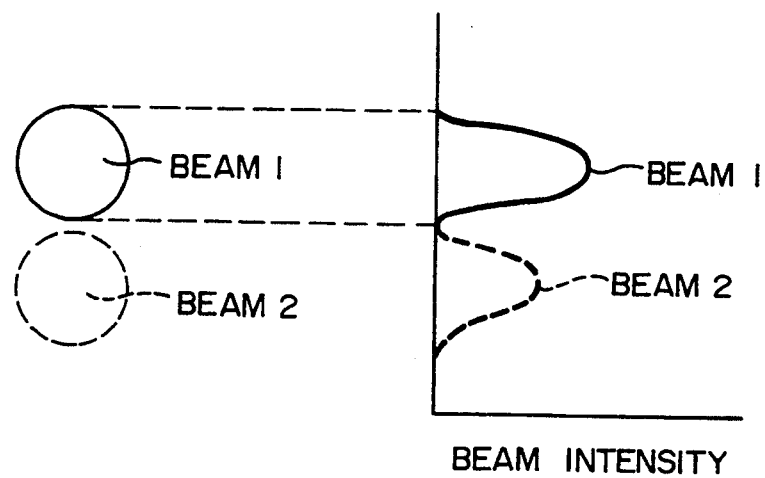
FIGS. 14a and 14b are explanatory views illustrating beam cuts of the optical data processing apparatus in the fourth embodiment form of the present invention.
Figure 14B:
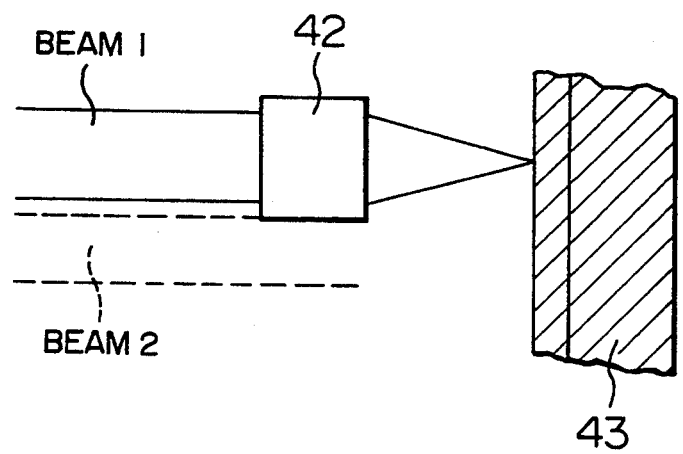

Next, explanation will be made of an optical data processing apparatus in a fourth embodiment of the present invention. FIG. 12 shows the structure of a short wave laser source according to the present invention, which is composed of a semiconductor laser 21 and a frequency doubler 22. The fundamental wave P1 emitted from the semiconductor laser 21 is introduced into a waveguide 2 formed in the frequency doubler 22 by way of lenses 24, 25 and the half-wave plate 26. The fundamental wave P1 is propagated in the waveguide 2 in the $TM_{00}$ mode which is the lowest order mode, and is then converted into the $TM_{10}$ mode which is the lowest order mode of the high harmonic wave which is then emitted from the frequency doubler 22 and is used as a short wave laser beam. In this embodiment, an optical system for cutting a part of the beam is not used, unlike the first embodiment. FIG. 13 shows an optical data processing apparatus, 3 mW of the beam emitted from the above-mentioned short wave laser source 40 passes through a beam splitter 41, and then is then irradiated onto an optical disc 43 which is a data reproducing medium by means of a lens 42. A reflected wave therefrom is reversely collimated by the lens 42 and is then reflected by the beam splitter 41. Thus, a detector made of Si can read a signal. FIGS. 14a and 14b show the lens 42 part in an enlarged view. The beam emitted from the short wave laser source 40 is turned into two beams, and accordingly, it cannot be directly converged up to the diffraction limit. Thus, the beam 2 is cut off by the lens 42 while the beam 1 alone is taken into by the lens 42 and is then focussed onto the optical disc 43. The NA of the lens 42 is 0.6, and the size of the focused spot is 0.6 μm. The beam obtained by the high harmonic wave is stable, and accordingly, a high density reading apparatus can be materialized. The recording density is four times as high as that obtained by using a conventional 0.78 μm semiconductor laser.

Figure 15:
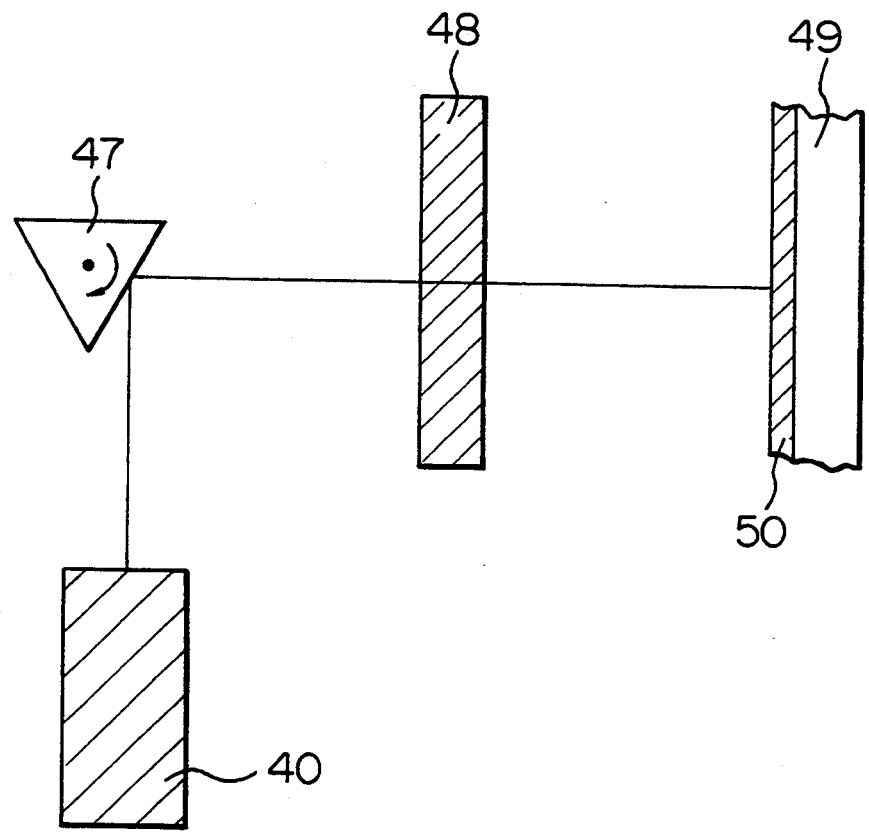
FIG. 15 is a schematic view illustrating an optical data processing apparatus in a fifth embodiment form of the present invention.
Figure 16:
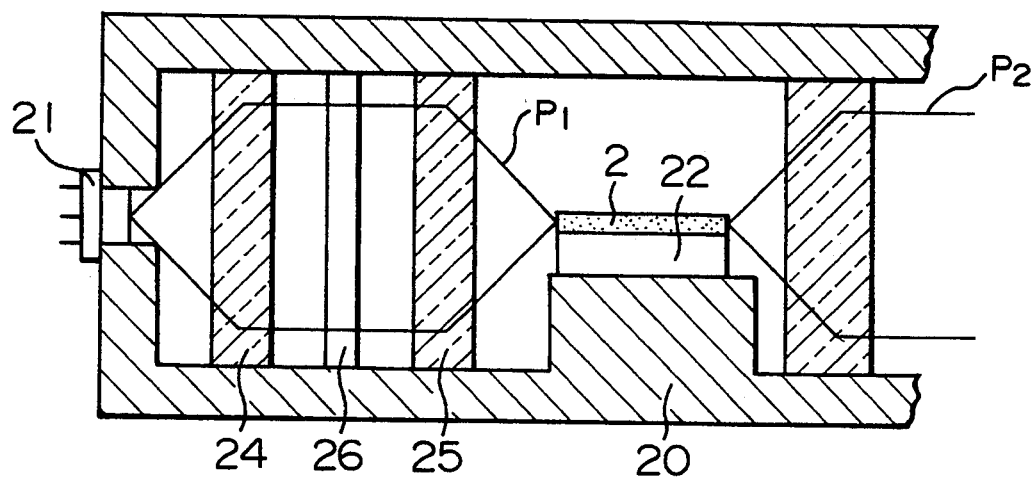
FIG. 16 is a schematic view illustrating a conventional short wave laser source.
Figure 17:
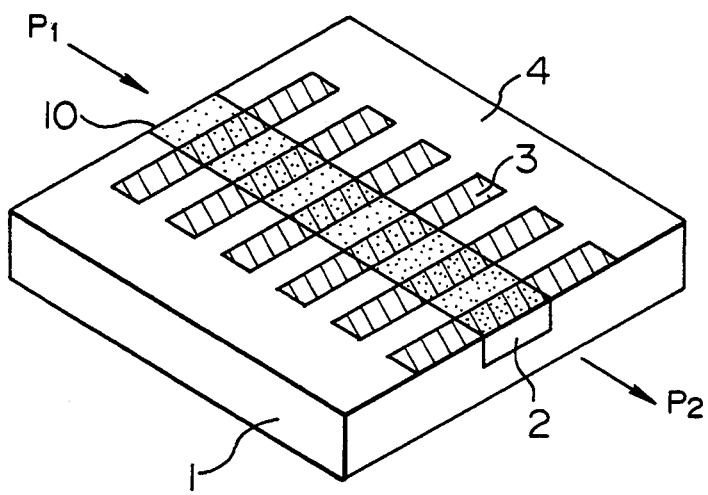
FIG. 17 is a schematic view illustrating a conventional frequency doubler.
Figure 18A:
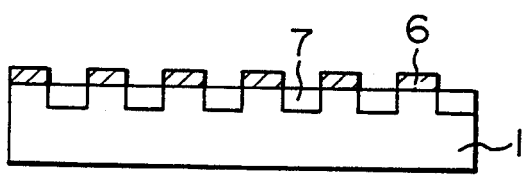
FIGS. 18a to 18d are sectional views for explaining a conventional method of manufacturing a frequency doubler.
Figure 18B:
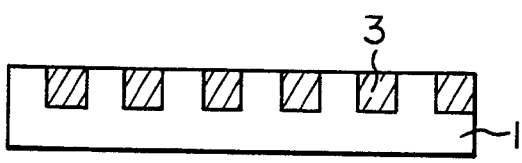
Figure 18C:
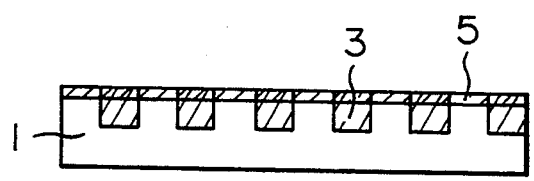
Figure 18D:
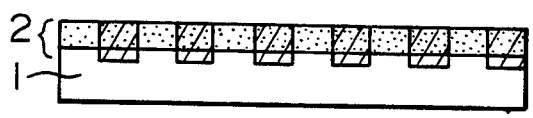
Figure 19A:
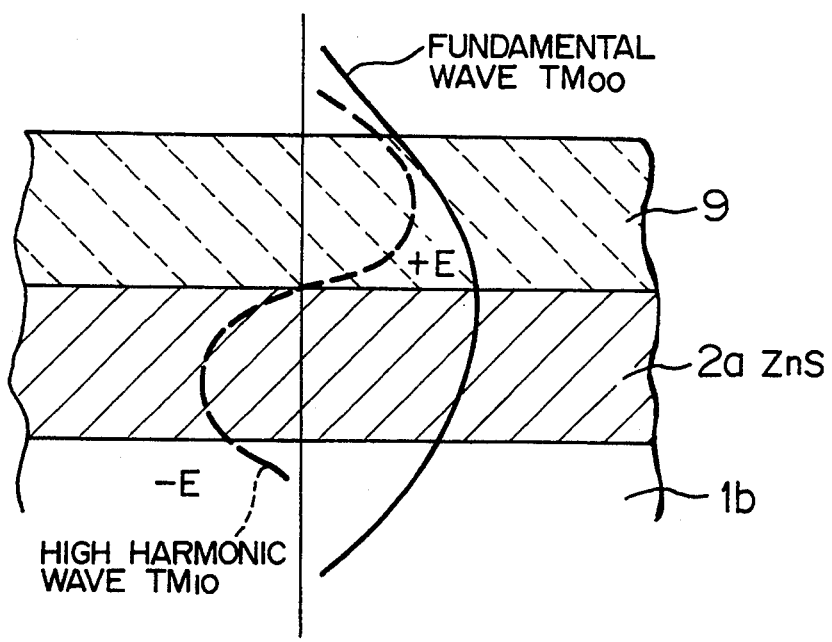
FIGS. 19a and 19b are sectional views illustrating a waveguide in the frequency doubler manufactured by the convention method.
Figure 19B:
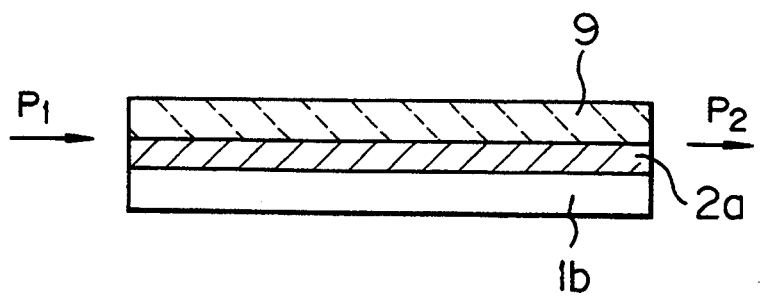
Figure 20A:
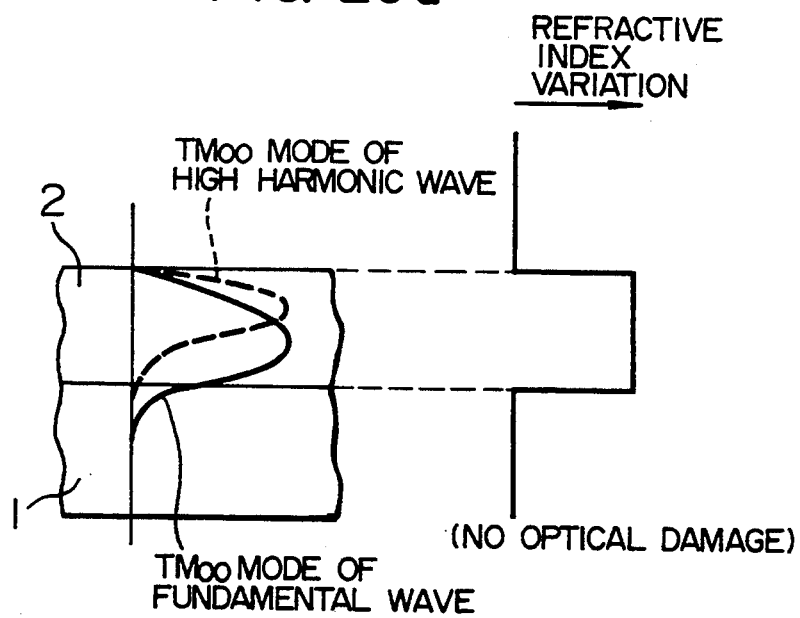
FIGS. 20a to 20b are sectional views illustrating the waveguide in the conventional frequency doubler for converting the $TM_{00}$ mode of the fundamental wave into the $TM_{00}$ mode of the high harmonic wave.
Figure 20B:
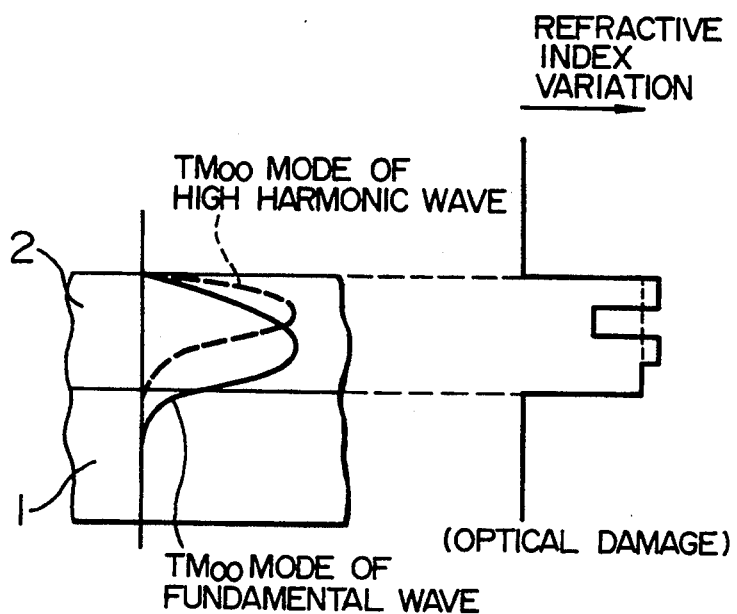

Next, explanation will be made of a short wave laser source and an optical data processing apparatus using the same as a fifth embodiment of the present invention. FIG. 15 shows the structure of the optical data processing apparatus according to the present invention. The structure of the short wave laser source 40 is similar to that in the second embodiment. A beam emitted from the short wave laser source 40 is reflected by a polygonal mirror 47 and is irradiated onto an Al film 49 which is covered thereover with a photosensitive medium and which serves as a recording medium, after it passes through a lens 48. By rotating the polygonal mirror 47, the photosensitive medium 50 can be scanned at a high speed. The focal distance of the lens 48 is 30 mm, and the focused spot size of the beam is 20 μm. Further, the semiconductor laser is modulated by a modulation frequency of 10 MHz. Thus, the recording medium is partly exposed thereby. This phenomenon can be used for forming a printing original. With this apparatus, highly accurate printing having a resolution of 50 lines per 1 m can be realized. Further, the stability of the high harmonic wave is within 1%, and accordingly, a printing original having less irregularity can be obtained.

It is noted that it is not necessary to cut off the beam in such a case that no limitation is given to the shape of the focused spot as in this embodiment.

Further, although $LiTaO_3$ and $LiNbO_3$ are used as nonlinear optical crystal, ferroelectric material such as $KNbO_3$ or KTP can be used. Further, the $TE_{00}$ mode and $TE_{10}$ mode or the like can be used as the lowest order mode of the fundamental wave and the high order mode of the high harmonic wave, respectively.

TABLE 1

| Fundament· wave | High harmonic wave | High harmonic wave mode | Beam shape | Effective refractive index | |
|---|---|---|---|---|---|
| | | | | Fundament· wave | High harm· wave |
| $\lambda_1$ | $\lambda_1/2$ | $TM_{00}$ | ○ | $N\omega$ | $N_{2\omega}$ |
| $\lambda_2$ | $\lambda_2/2$ | $TM_{10}$ | ○ | $N'\omega$ | $N'_{2\omega}$ |
| | | | ○ | | |

What is claimed is:

1. A frequency doubler comprising a nonlinear crystal substrate having formed therein (a) periodic domain inverted regions having a first nonlinear coefficient, (b) a nonlinear degradation layer having a second nonlinear coefficient which is much smaller than the first nonlinear coefficient, and (c) a waveguide, said nonlinear crystal substrate having an outer surface and having a third nonlinear coefficient which is substantially equal to said first nonlinear coefficient, said nonlinear degradation layer being formed in said waveguide on a side near to the outer surface of said crystal substrate by proton exchange, whereby a lowest order mode of a fundamental wave excited in said waveguide is converted into a high order mode of a high harmonic wave.

2. A frequency doubler as set forth in claim 1, wherein said nonlinear optical crystal substrate, is as $LiNb_xTa_{1-x}O_3$ substrate ($0 \leq X \leq 1$).

3. A frequency doubler as set forth in claim 1, wherein a boundary between the nonlinear degradation layer and the nonlinear optical crystal substrate is coincident with a phase inversion point of a $TM_{10}$ mode of a high harmonic wave.

4. A frequency doubler as set forth in claim 1, wherein the waveguide is formed by use of proton-exchange.

5. A frequency doubler as set forth in claim 1, wherein an infrared heating apparatus is used for instantly heating the nonlinear optical crystal substrate after said proton exchange so as to form the domain inverted regions.

6. A frequency doubler as set forth in claim 1, wherein an infrared heating apparatus is used for instantly heating the nonlinear optical crystal substrate after said proton exchange so as to form the waveguide.

7. A method of manufacturing a frequency doubler, comprising the steps of: periodically forming domain-inverted regions in a nonlinear optical crystal substrate, forming a non-linear degradation layer in said substrate on said domain-inverted regions by use of proton-exchange, said nonlinear degradation layer and said nonlinear optical crystal substrate defining therebetween a boundary which is coincident with a phase inversion point of the $TM_{10}$ mode of a high harmonic wave, and thereafter instantly annealing the substrate so as to form a waveguide.

8. A method of manufacturing a frequency doubler as set forth in claim 7, wherein an infrared heating apparatus is used for instantly heating the nonlinear optical crystal substrate after the proton exchange so as to form the domain inverted regions.

9. A method of manufacturing a frequency doubler as set forth in claim 7, wherein an infrared heating apparatus is used for instantly heating the nonlinear optical crystal substrate after the proton exchange so as to form the waveguide.

* * * * *